United States Patent [19]
Cox

[11] Patent Number: 5,868,544
[45] Date of Patent: Feb. 9, 1999

[54] AIRBORNE CARGO LOADER

[75] Inventor: Ronald L. Cox, Long Beach, Calif.

[73] Assignee: McDonnell Douglas Corporation, Hunington Beach, Calif.

[21] Appl. No.: 730,003

[22] Filed: Oct. 11, 1996

[51] Int. Cl.⁶ .................................................. B65G 39/12
[52] U.S. Cl. ........................ 414/659; 244/137.1; 414/347; 414/398; 414/495; 414/529; 254/89 H
[58] Field of Search .................................... 414/398, 399, 414/495, 347, 529, 659; 254/2 C, 89 H, 93 HP; 244/137.1

[56] References Cited

U.S. PATENT DOCUMENTS

| | | | |
|---|---|---|---|
| 860,622 | 7/1907 | Bannerman et al. | 414/495 |
| 1,685,697 | 9/1928 | Guerin | 254/93 HP |
| 2,614,800 | 10/1952 | Garlinger et al. | 254/89 H |
| 3,220,698 | 11/1965 | Carder | 254/2 C |
| 3,263,832 | 8/1966 | Williams, Jr. et al. | |
| 3,370,727 | 2/1968 | Shaw | 414/495 |
| 3,612,484 | 10/1971 | Gallagher et al. | 414/458 |
| 3,972,427 | 8/1976 | Stanley et al. | 244/137.1 |
| 4,312,619 | 1/1982 | Anderson et al. | |
| 4,461,455 | 7/1984 | Mills et al. | 254/89 H |
| 4,573,853 | 3/1986 | Lornez | |
| 4,586,684 | 5/1986 | Carter et al. | 244/137.1 |
| 4,662,809 | 5/1987 | Sturtz et al. | |
| 4,978,272 | 12/1990 | Leon | 414/495 |
| 5,467,827 | 11/1995 | McLouglin | 414/495 |
| 5,630,694 | 5/1997 | Ihara | 414/495 |

FOREIGN PATENT DOCUMENTS

| | | | |
|---|---|---|---|
| 2036436 | 7/1970 | Germany. | |
| 1439073 | 11/1988 | U.S.S.R.. | |
| 754107 | 8/1956 | United Kingdom | 254/89 H |
| 87427 | 2/1959 | United Kingdom. | |
| 2024167 | 1/1980 | United Kingdom | 254/93 HP |

OTHER PUBLICATIONS

"Aims for 1 hr. Turn–Around", *Aviation Week*, Nov. 7, 1960.
The revolutionary Power Drive Unit (PDU) . . . .
Satco, Inc., Container Section.

*Primary Examiner*—Thomas J. Brahan
*Attorney, Agent, or Firm*—Harness Dickey & Pierce P.L.C.

[57] ABSTRACT

An aircraft cargo loader is provided including a platform having a plurality of rollers for supporting cargo thereon. A base member is disposed below the platform and a plurality of telescoping jacks are disposed between the platform and the base member for lifting the platform. A supply of pressurized gas is connected to the plurality of telescoping jacks. An automatic load balancing system is provided for balancing the load on the platform. The cargo loader is designed to be lightweight and portable so that it can be loaded onto the aircraft and transported therewith.

9 Claims, 5 Drawing Sheets

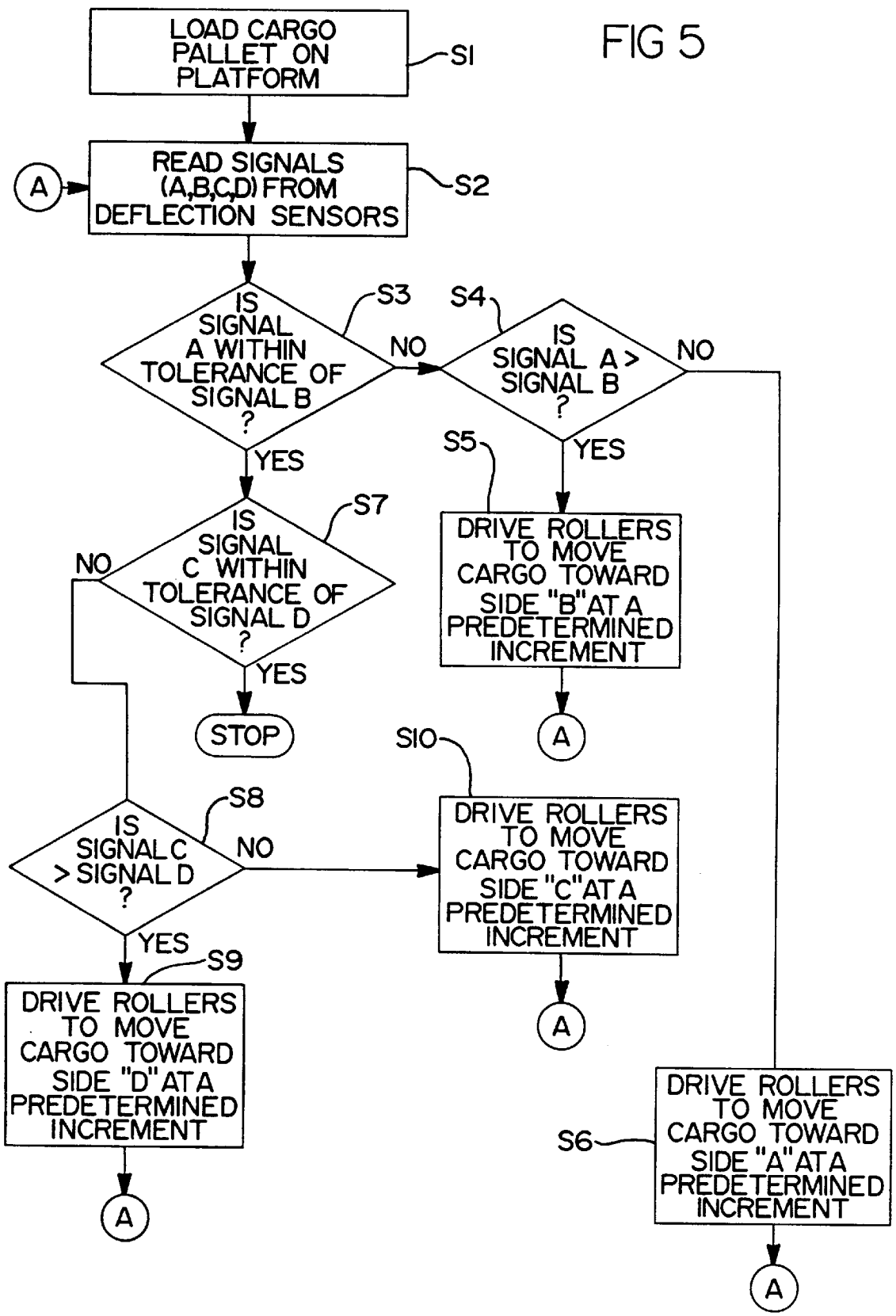

AIRBORNE CARGO LOADER

BACKGROUND OF THE INVENTION

Field of the Invention

The present invention relates to an aircraft cargo loader, and more particularly, to an aircraft cargo loader which is completely self-contained and capable of being installed in the aircraft fuselage and deployed from the aircraft.

BACKGROUND AND SUMMARY OF THE INVENTION

Apparatus for loading cargo into, and unloading cargo from, the aircraft are well known in the art. Aircraft cargo loaders transfer containers into and out of an aircraft through a cargo opening. Because the cargo opening is generally several feet above the ground level, aircraft cargo loaders generally have a lifting apparatus for lifting the cargo from ground level to the aircraft floor line. Many designs for such aircraft cargo loaders have been used in the airline industry. Many of the cargo loader designs require a large structure which is incapable of being loaded into the airplane itself. The requirement for an on-board cargo loader has been in existence for many years, for the commercial and military markets. However, a satisfactory design embracing all the required features of weight, size, handling, deployment, safety, reliability, speed of set up and operation, and operation of the loader has not been provided.

Accordingly, the present invention provides an airborne cargo loader which is a one piece, completely self-contained unit which is extremely compact and light weight (approximately 3,000 pounds for the present invention in comparison with 15,000–30,000 pounds for conventional loaders). The airborne cargo loader can be rapidly deployed from the aircraft requiring a minimum of personnel and set up. The operating power can be supplied from compressed air bottles or nitrogen bottles stored in the lower cargo hold of the aircraft and permanently connected to the loader. An extremely rapid cycle of raising and lowering maximum loads is available and controllable by the operator. A unique method of maintaining stability is also provided. During transition of the cargo onto the loader bed in the raised position, the telescopic air jacks are fully extended, i.e. bottomed out against the abutment faces under high pre-load ensuring adequate stability of the load bed. If the cargo loader is used for intermediate heights, an intermediate position can be obtained by adjusting telescoping tension ties, located inside some or all of the jacks. This permits the operator to check the level indicator fore, aft, and lateral, then if necessary to move the load until the indicators show that the loader platform is balanced within an acceptable range. The positioning of the load on the loader bed can also be automated. An operator has complete control of loading, positioning, lowering/raising and off-loading throughout the entire cycle.

The present invention provides an aircraft cargo loader comprising: a platform including a plurality of rollers for supporting cargo thereon; a base member disposed below said platform; a plurality of telescoping jacks disposed between said platform and said base member for lifting said platform; a supply of pressurized gas connected to said plurality of telescoping jacks; and means for driving said rollers to position said cargo in a balanced condition on said platform.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 5 is a flow chart illustrating the control system for balancing the cargo on the platform;

DETAILED DESCRIPTION OF THE PREFERRED EMBODIMENTS

Figure 1:
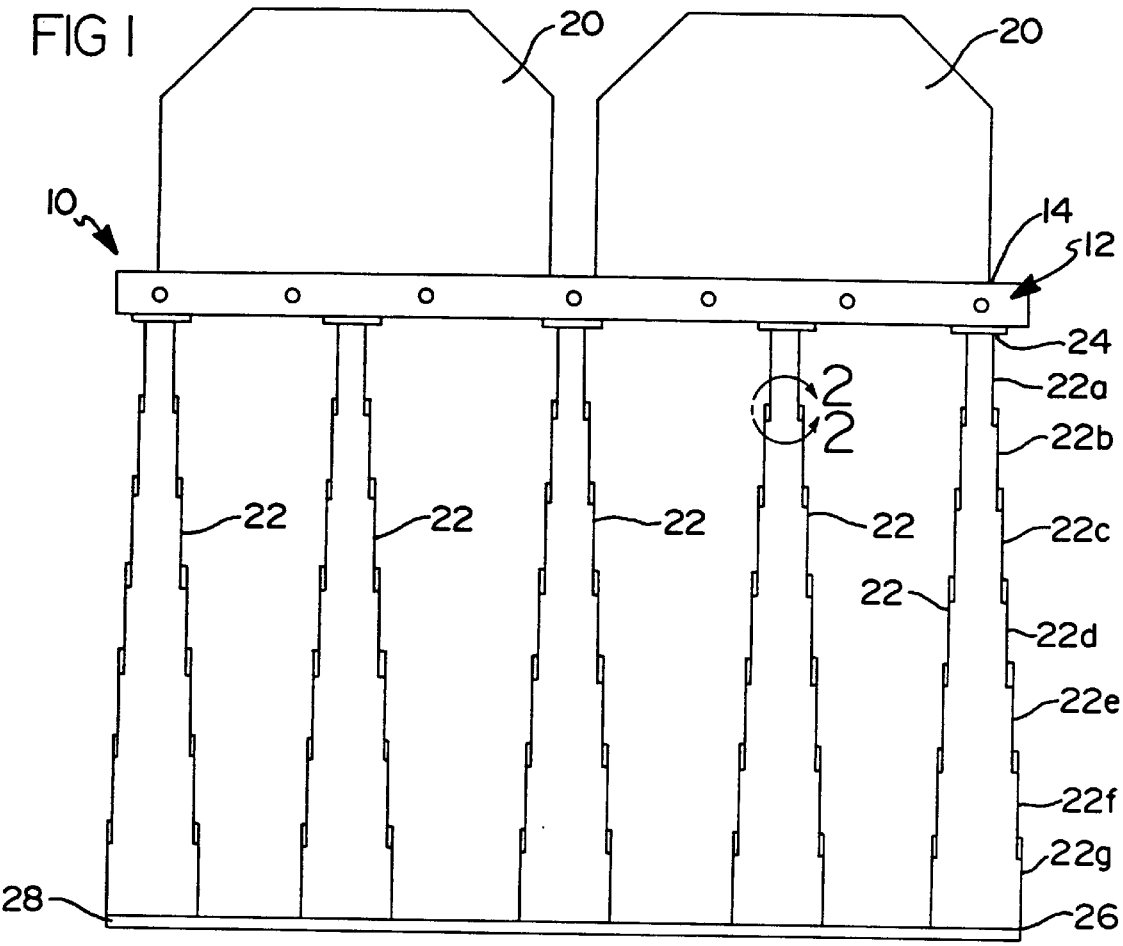
FIG. 1 is a schematic view illustrating the aircraft cargo loader of the present invention including a plurality of telescoping jacks for lifting the cargo platform.
Figure 2:
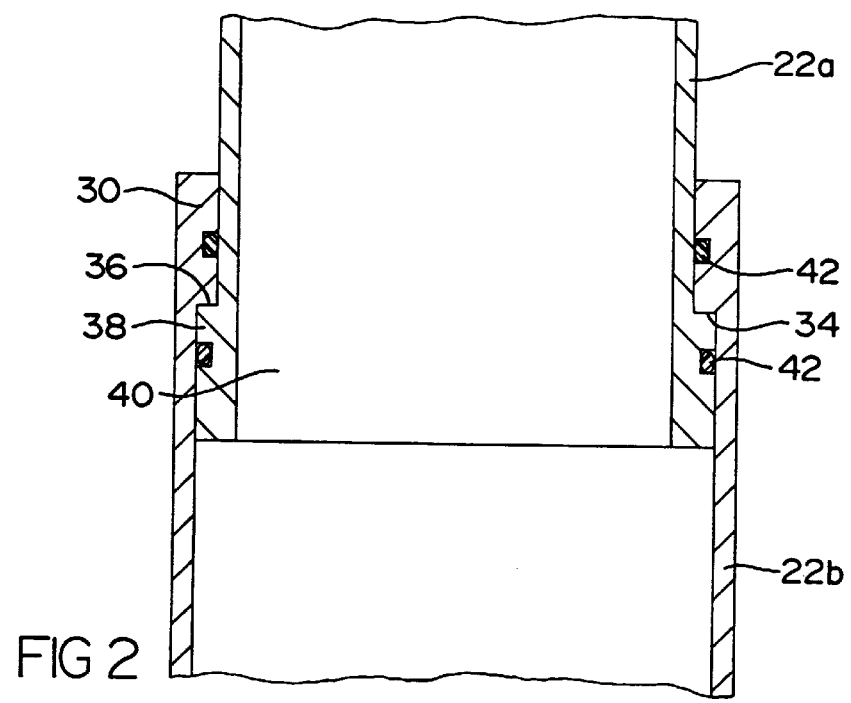
FIG. 2 is a detailed cross-sectional view illustrating the engagement of the mating cylinder portions of the telescoping jacks.

With reference to FIGS. 1–7, the aircraft cargo loader 10 will be described. The aircraft cargo loader 10 includes a platform 12 having a roller bed 14 including a plurality of lateral positioning electrically controlled rollers 16 and a plurality of longitudinally positioning electrical rollers 18. Electrical rollers 16, 18 are conventional cargo handling-type rollers. Roller bed 14 is utilized for balancing the cargo 20 which is placed on platform 12. The method of controlling the bed 14 will be described in detail later.

Platform 12 is supported by a plurality of telescoping jacks 22. Telescoping jacks 22 include a plurality of mating cylinder portions 22a–22g. A first mating cylinder portion 22a is attached at an upper surface thereof to the platform 12, and a second mating cylinder portion 22g has a lower portion 26 attached to a loader base 28. The intermediate mating cylinder portions 22b–22f are each provided with a radially inwardly extending rim portion 30 defining an abutment face 34 for engaging a corresponding abutment face 36 of a radially outwardly extending rim portion 38 of a mating cylinder portion received within the inwardly extending rim 30. The mating cylinders 22a–22g define a pressure chamber 40 which is expandable upon introduction of pressurized gas which causes the platform 12 to be lifted and the mating cylinder portions 22a–22g of telescoping jacks 22 to extend in a vertical direction. The inwardly extending rim 30 and outwardly extending rim 38 are each provided with o'ring seals 42 for sealing the pressure chamber 40 of the telescoping jacks 22. Each of the telescoping jacks 22 are provided with compressed gas through supply lines 44. Supply lines 44 are attached to a source of compressed gas such as a gas bottle 46 containing compressed nitrogen or air. Supply line 44 is provided with a control valve 48 for opening and closing the supply of compressed gas to supply lines 44.

Figure 7:
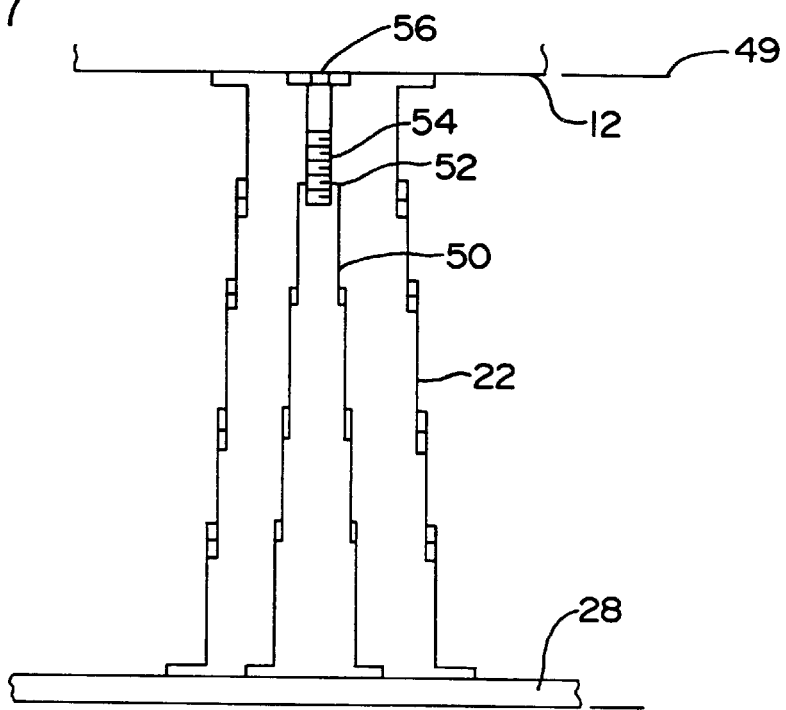
FIG. 7 illustrates a tension tie rod arrangement for limiting the movement of the telescoping jacks to an intermediate position.

When it is desired to utilize the aircraft cargo loader at an intermediate level 49 below the full extension of the telescoping jacks 22, a tension tie rod 50 can be utilized at each corner jack 22 for limiting the height at which the telescoping jacks 22 can extend, as shown in FIG. 7. The travel limiting tension ties 50 operate as a telescopic unit mounted within the corner air jacks 22. Each end of the tension tie 50 is attached to the respective platform 12 and base 28 to which the air jacks 22 are attached. The upper attachment is provided with accurate adjustment for travel height capability of the platform 12. This adjustment is accomplished by a nut 52 and thread assembly 54, which may be preset before pressurization or at partial pressure, in the required elevated position, but below the loaded operating pressure. The operator can make the adjustment at the upper surface by inserting a tool into an upper end 56 of threaded member 54. Other known means of adjustment can also be utilized.

The balancing of cargo 20 on platform 12 can be performed either manually by controlling the electrical roller bed 14 or by an automatic control system. The manual control of roller bed 14 may include a joy stick 60 for controlling the rotation of lateral positioning rollers 16 and longitudinal positioning rollers 18. The operator can determine the imbalance of the platform 12 by reference to fore and aft bed level indicator 62 and lateral bed level indicator 64 and make the determination of which direction the cargo 20 should be moved in order to balance the platform 12. By operating the joy stick 60, electrical signals will be delivered to each of the lateral and longitudinal positioning rollers 16, 18, respectively in accordance with the operator's movement of joy stick 60.

The balancing of the load can also be performed automatically as illustrated in FIG. 5. In the automatic control system, deflection sensors 70A, 70B are provided at the front and rear of the platform, respectively, and deflection sensors 70C, 70D are provided on each side of the platform 12. Each of the deflection sensors 70A–70D provide a signal (A, B, C, D) representative of the deflection on the respective sides of the platform 12. In operation, the cargo is loaded on the platform 12 (S1). The signals (A, B, C, D) from the deflection sensors 70A–70D are read (S2). The controller then determines if the signal A is within a predetermined tolerance of signal B (S3). If no, the controller determines if the signal A is greater than the signal B(S4). If yes, the longitudinal positioning rollers 18 are activated to move the cargo toward the rear (side B) of the platform 12 at a predetermined increment, such as one inch (S5). If in step S4, the signal A is not determined to be greater than the signal B, the longitudinal positioning rollers 18 are activated to move the cargo from the rear to the front (side A) of the platform 12 at a predetermined increment (S6). After each of steps S5 and S6, the controller returns to step S2 so that the process can be repeated in order to determine if the adjusted cargo position has properly balanced the load on the platform 12.

If in step S3, the controller determines that the signal A is within the tolerance of signal B, then the controller proceeds to step S7 where the controller determines if the signal C is within the tolerance range of signal D. If no, the controller determines if signal C is greater than signal D (S8). If yes, the lateral positioning rollers 16 are activated to move the cargo toward side D at a predetermined increment (S9), and the control returns to step S2 to determine if the adjustment of the cargo has balanced the load on platform 12. If in step S8 the signal C is not determined to be greater than signal D, the lateral positioning rollers are activated to move the cargo toward side C of the platform 12 (S10). The control then returns to step S2 and the process continues until the signal A is within the predetermined tolerance of signal B and signal C is within the predetermined tolerance of signal D.

Figure 6:
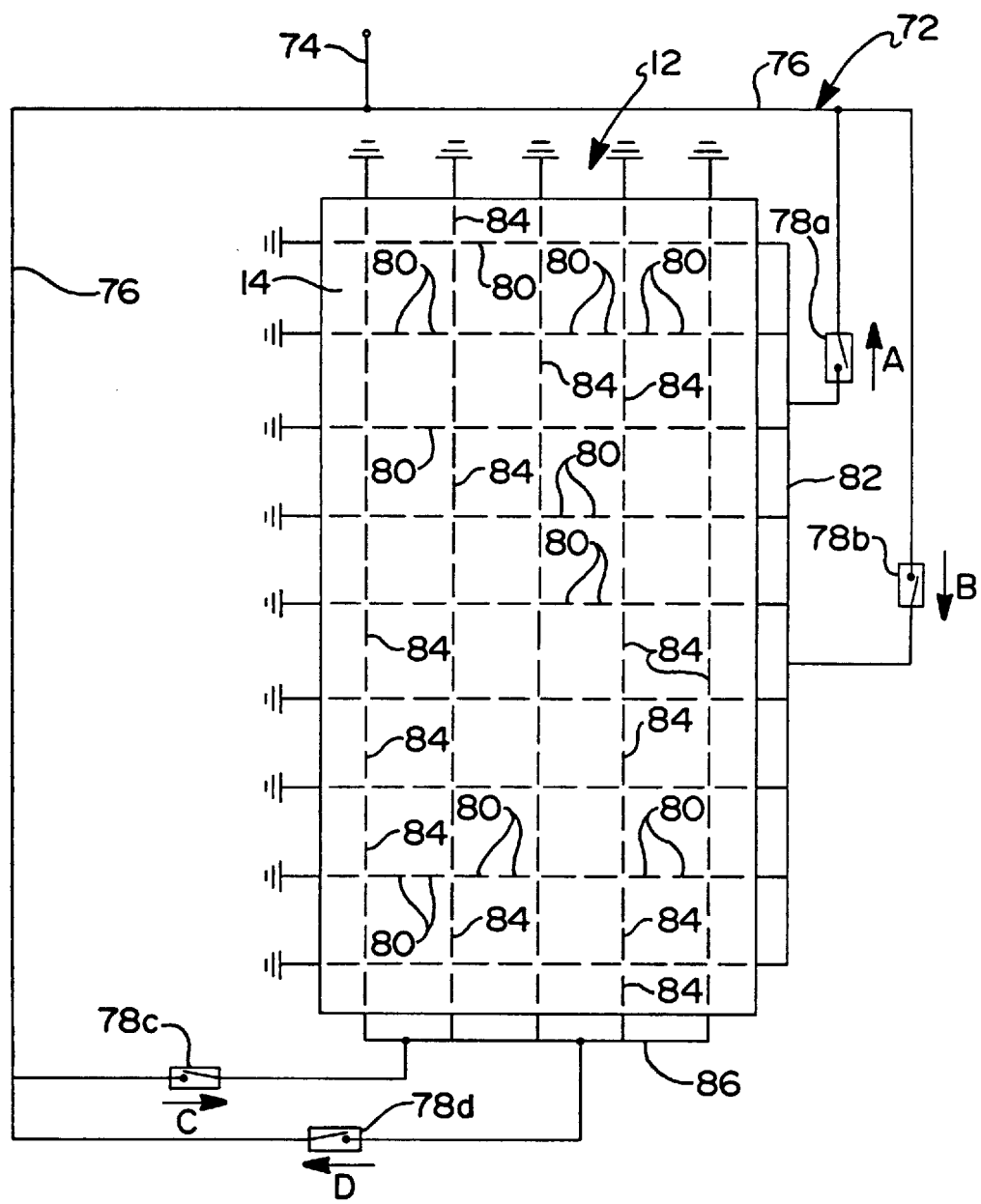
FIG. 6 is a schematic view illustrating the roller bed having automatic control of the rollers by mercury switches.

Alternatively, the load on platform 12 can be balanced by the automatic load positioning circuit 72 shown in FIG. 6. Load positioning circuit 72 includes a power supply 74 connected via a plurality of electrically conductive wires 76 to four mercury level switches 78a–78d. Switches 78a and 78b are longitudinal switches which are connected to fore and aft rollers 80 via electrically conductive wires 82 for adjusting the longitudinal position of the cargo. Switches 78c and 78d are lateral switches which are connected to lateral rollers 87 via electrically conductive wires 86 for adjusting the lateral position of the cargo. Switches 78a–78d each activate the rollers 80, 84 to move the cargo in the direction of arrows A–D, respectively. The mercury level switches 78a–78d energize the rollers until the loader bed 14 is level under the weight of the cargo or pallets. The mercury level switches are commercially available.

Figure 4:
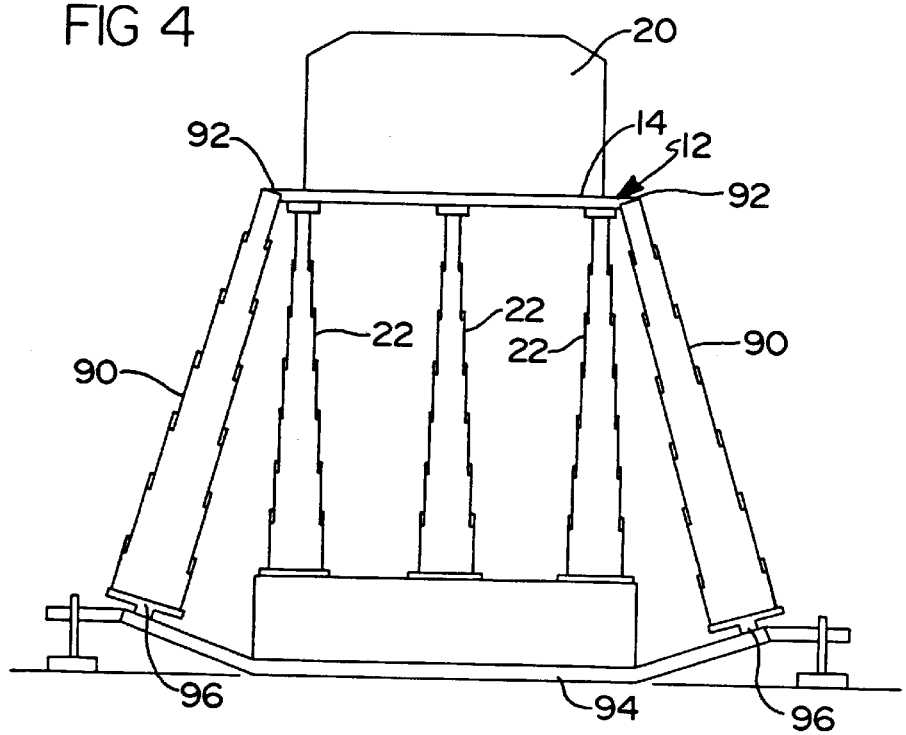
FIG. 4 illustrates a second embodiment of the present invention which includes side-sway stabilization actuators.
Figure 3:
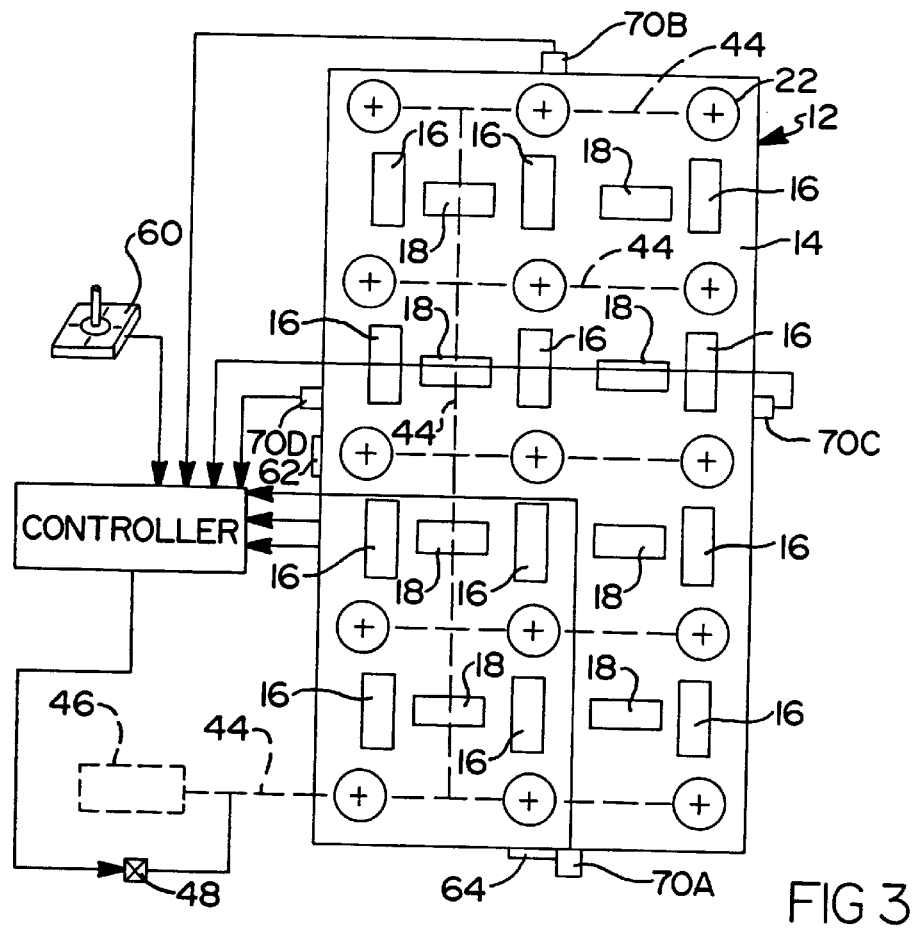
FIG. 3 is a schematic view illustrating the roller bed and the pressurized gas supply system according to the principles of the present invention.

The aircraft cargo loader can be provided with side-sway stability by using inclined telescopic air jacks 90 which are connected to platform 12 by pin joint 92 and to base 94 by pin joint 96, and provide stability through the full range of movement of the platform 12, as shown in FIG. 4.

Figure 8:
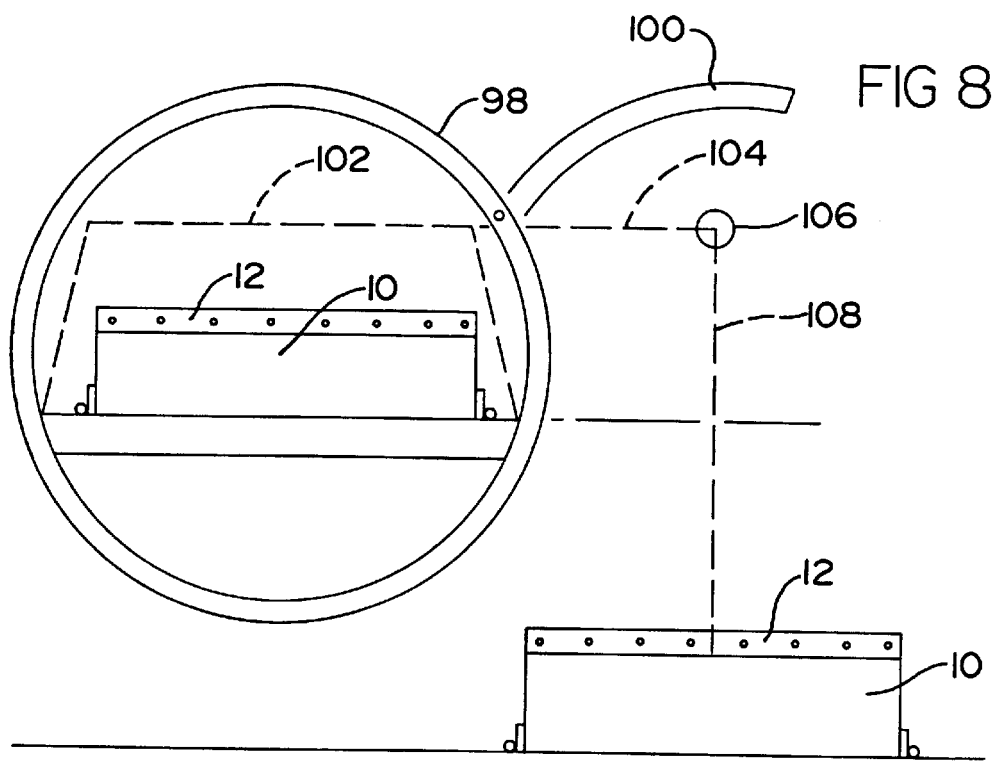
FIG. 8 is a schematic view illustrating the loading of the aircraft cargo loader into the fuselage of an aircraft and rapid deployment of the loader from the aircraft.

With reference to FIG. 8, the method of loading the aircraft cargo loader 10 into the aircraft fuselage 98 is shown. The aircraft fuselage 98 is provided with a cargo bay door 100 which opens in an upward direction to allow the loading of cargo into the aircraft fuselage 98. According to a preferred embodiment of the present invention, a gantry 102 is provided for supporting a beam extension 104 having a power winch mechanism 106 including a cable 108 which can be attached to the aircraft cargo loader 10. The aircraft cargo loader 10 is lifted by the power winch 106 and the beam extension 104 is retracted into and out of the air craft fuselage 98 so that the aircraft cargo loader 10 is received in the aircraft fuselage 98 and can be easily unloaded.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An aircraft cargo loader, comprising:
   a platform including a plurality of rollers for supporting cargo thereon;
   a base member disposed below said platform;
   a plurality of telescoping jacks disposed between said platform and said base member for lifting said platform;
   a supply of pressurized gas connected to said plurality of telescoping jacks; and
   an adjustable tension tie member for adjustably limiting the motion of at least one of said plurality of telescoping jacks to a predetermined intermediate height, wherein said adjustable tension tie member is internally disposed in said at least one of said telescoping jacks.

2. The aircraft cargo loader according to claim 1, wherein said supply of pressurized gas includes nitrogen stored in a pressurized container.

3. The aircraft cargo loader according to claim 1, wherein said plurality of rollers include a set of longitudinal positioning rollers and a set of lateral positioning rollers.

4. The aircraft cargo loader according to claim 1, further comprising at least one side sway stabilizing jack angularly connected to said platform and to said base by a pair of pin joints.

5. The aircraft cargo loader according to claim 1, further comprising means for driving said rollers to position said cargo in a balanced condition on said platform.

6. An aircraft cargo loader, comprising:
   a platform including a plurality of rollers for supporting cargo thereon;
   a base member disposed below said platform;
   a plurality of telescoping jacks disposed between said platform and said base member for lifting said platform;
   a supply of pressurized gas connected to said plurality of telescoping jacks; and
   wherein said plurality of telescoping jacks include a telescoping jack disposed generally at each of four corners of said platform and further includes a plurality of telescoping jacks disposed intermediate said four corners, said telescoping jacks at each of said four corners including an internal tension tie member for limiting motion of said telescoping jacks.

7. The aircraft cargo loader according to claim 6, further comprising means for driving said rollers to position said cargo in a balanced condition on said platform.

8. An aircraft cargo loader, comprising:
   a platform including a plurality of rollers for supporting cargo thereon;
   a base member disposed below said platform;
   a plurality of telescoping jacks disposed between said platform and said base member for lifting said platform;
   a supply of pressurized gas connected to said plurality of telescoping jacks; and
   means for driving said rollers to position said cargo in a balanced condition on said platform, wherein said plurality of rollers include a set of longitudinal positioning rollers and a set of lateral positioning rollers,
   wherein said means for driving said rollers includes a plurality of deflection sensors and means for comparing signals received from said sensors and determining if said platform is properly balanced and if not, driving said longitudinal and lateral positioning as necessary to properly balance the cargo loaded on said platform.

9. An aircraft cargo loader, comprising:
   a platform including a plurality of rollers for supporting cargo thereon;
   a base member disposed below said platform;
   a plurality of telescoping jacks disposed between said platform and said base member for lifting said platform:
   a supply of pressurized gas connected to said plurality of telescoping jacks; and
   means for driving said rollers to position said cargo in a balanced condition on said platform, wherein said plurality of rollers include a set of longitudinal positioning rollers and a set of lateral positioning rollers,
   wherein said means for driving said rollers includes mercury level switches for sensing platform levels longitudinally and laterally and controlling operation of the plurality of rollers to balance a load on said platform.

* * * * *